United States Patent [19]

Reinartz et al.

[11] Patent Number: 4,769,554
[45] Date of Patent: Sep. 6, 1988

[54] ELECTRICAL SWITCHING MECHANISM FOR CIRCUITS IN AUTOMOTIVE VEHICLES

[75] Inventors: Hans-Dieter Reinartz, Frankfurt am Main; Helmut Steffes, Hattersheim, both of Fed. Rep. of Germany

[73] Assignee: Alfred Teves GmbH, Frankfurt am Main, Fed. Rep. of Germany

[21] Appl. No.: 98,640

[22] Filed: Sep. 17, 1987

[30] Foreign Application Priority Data

Sep. 24, 1986 [DE] Fed. Rep. of Germany ....... 3632383

[51] Int. Cl.⁴ ............................................. B60Q 1/44
[52] U.S. Cl. ............................. 307/10 R; 307/10 LS; 307/9; 200/82 D; 200/16 C; 340/52 C; 340/52 B
[58] Field of Search ...................... 307/9, 10 R, 10 LS; 200/61.45 R, 61.88, 61.91, 81 R, 82 R, 82 B, 82 E, 82 D, 83 R, 61.89, 61.87, 16 B–16 F, 292, 153 J, 252; 340/52 B, 52 C, 52 R, 52 A; 361/400; 364/426

[56] References Cited

U.S. PATENT DOCUMENTS

| | | | |
|---|---|---|---|
| 3,439,322 | 4/1969 | Gardner | 340/52 C |
| 3,857,008 | 12/1974 | Donk | 200/153 J |
| 3,964,017 | 6/1976 | Arai et al. | 340/52 C |
| 3,999,431 | 12/1976 | Makarainen | 200/82 D X |
| 4,049,326 | 9/1977 | Zobel | 340/52 B X |
| 4,068,202 | 1/1978 | Lyons, III | 200/16 D X |
| 4,262,278 | 4/1981 | Howard et al. | 340/52 C |
| 4,290,045 | 9/1981 | Killinger | 340/52 C |
| 4,316,067 | 2/1983 | Whiteman, Jr. | 200/292 X |
| 4,322,588 | 3/1982 | Chumley et al. | 200/16 C X |
| 4,383,145 | 5/1983 | Zelina, Jr. | 200/16 D |
| 4,438,301 | 3/1984 | Zeeland | 200/16 C |
| 4,545,240 | 10/1985 | Leiber | 340/52 B X |

Primary Examiner—William M. Shoop, Jr.
Assistant Examiner—Paul Ip
Attorney, Agent, or Firm—James B. Raden; Robert P. Seitter

[57] ABSTRACT

The present invention is concerned with an electrical switching mechanism for circuits associated with hydraulic systems in automotive vehicles. The switching mechanism comprises at least one switch (13, 15) disposed on a printed circuit board (1), which switch (13, 15) includes a sliding contact (23, 24) fixed to a hydraulically movable carrier (25). The sliding contact (23, 24), along its path of displacement, in various positions (27, 28, 29, 51), between contacts (11, 12; 14, 16) stationarily disposed on the printed circuit board in oppositely spaced relationship, provides for electrically conductive connection or disconnection.

6 Claims, 6 Drawing Sheets

ELECTRICAL SWITCHING MECHANISM FOR CIRCUITS IN AUTOMOTIVE VEHICLES

BACKGROUND OF THE INVENTION

The present invention is concerned with an electrical switching device for circuits in automotive vehicles and, in particular, to a switching device comprising at least one switch disposed on a printed circuit board and associated with a hydraulic brake system.

W. German Pat. No. 25 46 084 discloses a switching device for warning indications in automotive vehicles, wherein a reed contact of a reed relay is disposed in parallel to one or more warning switches, with the reed relay being fixed to a printed circuit board. Voltage is supplied to the relay coil by the warning switch or switches. Next to the reed contact is located a permanent magnet the field of which is sufficient to keep the contact in closed position rather than to close it.

W. German Pat. No. 35 00 590 also discloses an electrical switching device comprising a supporting panel provided with printed conductors to which are fixed switching units such as switches, pushbuttons, coding switches, safety switches or the like. The supporting panel with the switching units fixed thereto is mounted in a housing. Current connections of a flat configuration lie in a plane disposed in parallel to the plane of the printed conductors and protrude from the housing.

SUMMARY OF THE INVENTION

It is the object of the present invention to improve an electrical switching device of the afore-mentioned type that has a simple and space-saving construction, wherein the switching element is able to selectively connect and disconnect circuits not only between its two end positions but also in intermediate positions.

This object is provided in that the switch contains a sliding contact fixed to a hydraulically movable carrier that moves it into or out of electrical contact with contacts configured as expanded printed conductor ends fixed to the printed circuit board along the sliding path thereof in different positions in oppositely spaced relationship. With this device, circuits can be connected or disconnected in electrically conductive manner in response to the position of the sliding contact along the entire sliding distance coverable between the end positions of the sliding contact. This will enable the current flow in the circuits to be associated to the respective position of the drive for the sliding contact and permit a particularly economical manufacture of the stationary contacts as printed conductor ends along with the further conductor ends on the printed circuit board.

According to a preferred form, in addition to the first switch, at least one second switch is provided on the printed circuit board, which comprises a sliding contact connected to the carrier and which, along its sliding path, in different positions, connects, in electrically conductive manner, contacts stationarily disposed on the printed circuit board in oppositely spaced relationship and configured as expanded conductor ends. The sliding contact of the first switch does not contact the contacts associated with the second switch in such positions. Hence, the two switches will be closed and opened, respectively, in different positions of the hydraulically operable carrier. This means that different pressures acting on the carrier correspond to the closing positions and to the opening positions of the switches. The switching mechanism can thus be used for measuring and gauging the respective pressure.

In an advantageous form of the invention, the contacts of the first switch extend in a planar manner and in longitudinally parallel spaced relationship with respect to one another and, through printed conductors and printed conductor connections, are in communication with brake skid control circuit means. Two contacts of the second switch are bridgeable through the sliding contact, through printed conductors and printed conductor connections, and are in communication with an operating voltage source and a warning means. The brake skid control circuit means, through opening the first switch, is rendered inoperative or partly inoperative, whereas the warning means generates, for example, a visual and/or audible signal indicative of a pressure drop in the hydraulic brake system. Hence, the afore-described system operates as a pressure warning switch which, at predetermined pressures establishes connections or disconnections between contacts.

According to a preferred form of the invention, the contacts of the first switch, in a first position of the sliding contacts of the two switches corresponding to a hydraulic zero pressure exerted on the carrier, are open while the contacts of the second switch are bridged through the sliding contact, and the contacts of the first switch, in a position of the sliding contacts corresponding to a lower threshold value of the hydraulic pressure, are bridged through the sliding contact while the contacts of the second switch are open in that position. This device generates a signal at a zero pressure in the hydraulic brake system.

Preferably, the second switch contains a third and a fourth contact arranged in series with the second contact in spaced relationship therefrom and in parallel to the elongated first contact. The third and fourth contacts are respectively connected to a coil of a bistable relay containing a working contact through which the operating state of a motor driving a pressure pump for the hydraulic fluid is controllable through a pump relay. The second switch in that system exhibits three different switching positions corresponding to respectively different pressures of the hydraulic brake system. In the first switching position, current is supplied to the warning device which signals the zero pressure in the hydraulic system. In the second switching position, a circuit to a coil of the bistable relay is closed, the working contact of which closes a circuit in which is located the pump relay. The latter thereby starts the motor of the pressure pump. In the third switching position, the circuit of the second coil of the bistable relay is closed. The relays opens the working contact thereby causing the pump relay to drop out and to switch off the motor of the hydraulic pressure pump. This device controls the pressure pump and, hence, the hydraulic pressure of the brake system in the ON/OFF operation. At the same time, the pressure is monitored for a lower threshold. Once the pressure decreases below the said lower threshold value, a signal is generated. The first switch turns off or partly turns off the brake skid control means, once the pressure drops below a predetermined threshold value. The first switch, hence, has two switching positions of which the second extends across an extended sliding path of the sliding contact.

According to another form of the invention, a third switch is provided on the printed circuit board. It includes a sliding contact in communication with the carrier, which sliding contact, among three contacts disposed along the sliding path thereof in different positions on the printed circuit board in oppositely spaced relationship and configured as expanded printed conductor ends in and between the two or three first positions, conductively connects a common contact to a second contact in communication with a coil of a bistable relay. In a third or fourth position, it conductively connects the common contact to a contact in communication with the other coil of the bistable relay, with a pump relay being controllable through a relay via which a motor of a pressure pump for the hydraulic fluid can be turned on and off. In that device, the pressure pump is switched off once an upper threshold value of the pressure is exceeded. Below that threshold value of the pressure, the pressure pump is permanently switched on. By increasing the number of positions of the sliding contacts, it is possible for the warning means to be operated until a lower threshold value of the pressure is reached at which also the brake slip control means is released through closing the first switch.

Feasibly, the second switch contains a third contact which, in a second position, can be connected by the sliding contact to the first contact. The third contact along with an elongated contact of a third contact, comprising two contacts bridgeable by a sliding contact in and between a second and a third position, is in communication with the coil of a relay comprising a working contact through which the operating state of a motor driving a hydraulic pressure pump is controllable. Through a diode applied to the working current output, it is in communication with the other contact of the third switch. In that device, the pump motor is driven from a relay which may be in the form of a simple d.c. relay. The efforts involved with the control of the pump motor are reduced thereby.

An advantageous form includes third and fourth switches located on the printed circuit board. A sliding contact of the third switch connects, in electrically conductive manner, two elongated contacts of the third switch disposed in parallel with respect to one another, in and between the first and a third position. A sliding contact of the fourth switch connects, in electrically conductive manner, two elongated contacts extending in parallel with respect to one another, in and between four positions. Two contacts of the third and fourth switches are jointly connected to the coil of a relay comprising a working contact through which a motor of a hydraulic pressure pump is controllable either directly or indirectly via a pump relay. The other contact of the third switch can be applied to operating voltage, and the other contact of the fourth switch, through a diode, is in communication with the working current output of the relay contact. This form permits a precise association of the various functions of the pressure control and pressure warning switch to the individual pressure ranges.

While the brake skid control means, in the pressure range corresponding to the distance of the two first positions is turned off by the first switch, the warning means, in this lower pressure range, indicates the drop below a critical pressure value, with the pump remaining turned on. Above the pressure threshold value corresponding to the second position of the sliding contacts, the brake skid control means are turned on and the warning means switched off. The pump remains turned on until an upper threshold value of the pressure is exceeded which corresponds to the third position of the sliding contacts. The pump is then turned off and so remains until the pressure of the hydraulic fluid drops again below the threshold value corresponding to the third position of the sliding contacts.

According to another form of the invention, the other contact of the third switch, through a contact operable by the ignition key of an automotive vehicle, can be applied to operating voltage. In that device, the pressure warning and pressure control device, through the ignition key, is placed into a condition ready for operation thereby rendering operative also all the elements of the automotive vehicle dependent on the pressure warning and pressure control switch. The pump motor circuit does not run across the ignition key contact thereby permitting a layout of that contact for lower currents.

Preferably, a third switch is disposed on the printed circuit board. It comprises a sliding contact in communication with the carrier, which sliding contact, among three contacts disposed along the sliding path thereof, in various positions on the printed circuit board in oppositely space relationship, and configured as expanded printed conductors, in and between the three first positions, connects, in electrically conducting manner, a common contact to a second contact in communication with the reset input of a Flip-Flop. In the fourth position, it connects, in electrically conducting manner, the common contact to the third contact in communication with the set input of the Flip-Flop, with the Flip-Flop, at the outlet side thereof, being connected to a switching transistor capable of controlling a pump relay through which a motor actuating a hydraulic pressure pump, can be turned on and off. In this form of embodiment, only electronic components are provided on the printed circuit board, besides the switches, thereby permitting a particularly space-saving construction of the device. The brake skid control means is turned off only between the first two positions of the sliding contacts. Between these positions, the warning means is operated. The pump motor is turned off above a pressure threshold corresponding to the fourth position of the sliding contacts.

BRIEF DESCRIPTION OF THE DRAWING

The invention will now be described in greater detail with reference to the figures of the accompanying drawing, wherein.

DETAILED DESCRIPTION OF PREFERRED EMBODIMENTS

An electrical switching mechanism comprises a printed circuit board 1 of kraft paper, epoxide resin, ceramic or the like, dimensioned approximately 25×50 mm. Disposed on the printed circuit board 1 are printed conductors 2, 3, 4, 5, 6, 7, 8, 9. Printed conductors 2 through 9, at the ends of the printed circuit board 1, are connected to plug connectors 10 for connection of external lines. The printed conductors 2 and 3, at the ends thereof located on the printed circuit board 1, expand into stationary, elongated and planar contacts 11 and 12 of a switch 13. Both contacts 11, 12 extend in parallel with respect to one another and have the same length. The printed conductor 4, at the end thereof disposed on the printed circuit board 1, expands into a stationary, elongated, planar contact 14 of a switch 15 comprising three additional, circular or approximately circular contacts 16, 17, 18 located equidistantly from one another in parallel to the longitudinal axis of contact 14. The contacts 16, 17, 18 respectively form the enlarged ends of the printed conductors 5, 6, and 7.

Figure 1:
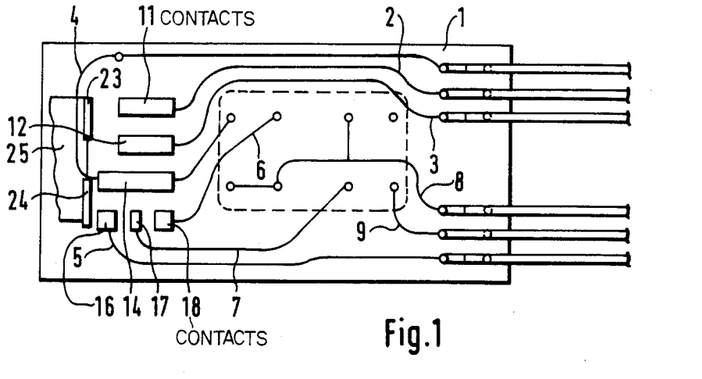
FIG. 1 is a schematical plan view of an electrical switching device according to the invention.
Figure 2:
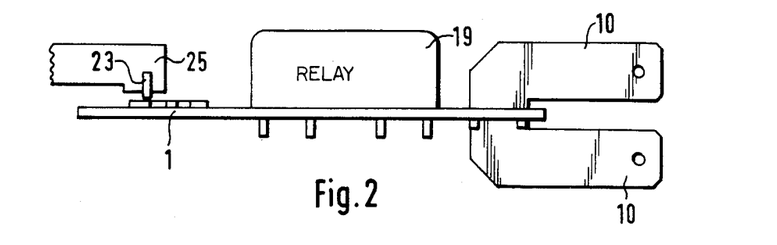
FIG. 2 is a side view of the switching mechanism according to FIG. 1.
Figure 3:
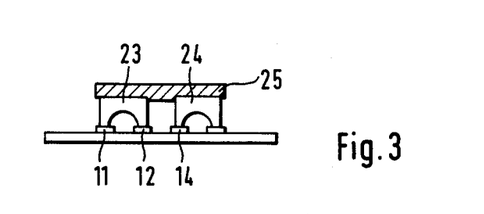
FIG. 3 is a front view of the switching mechanism according to FIG. 1.
Figure 4:
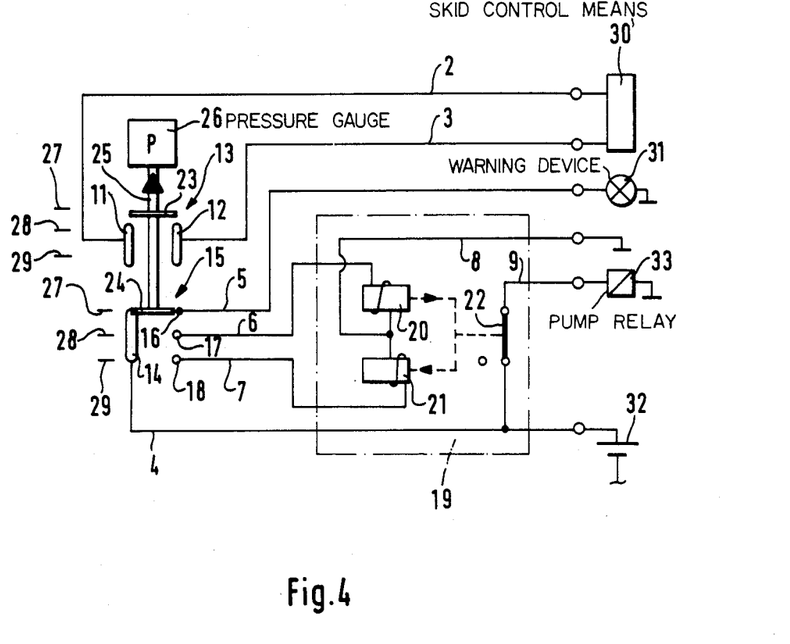
FIG. 4 is a circuit diagram of the switching mechanism shown in FIGS. 1 to 3.

Moreover, a bistable relay 19 is provided on the printed circuit board 1, which comprises, as best seen in FIG. 4, two coils 20, 21 each of which is in communication with one of the printed conductors 6, 7. The other connections of the coils are commonly connected to the printed conductor 8. Relay 19 contains a switch-over contact 22 the working contact outputs of which are in communication with printed conductors 4 and 9. Each switch 13, 15 comprises a sliding contact 23, 24. Both sliding contacts 23, 24 are fixed to a common carrier 25 which is a component part of a hydraulically operable means 26, such as a pressure gauge or a pressure test means for determining the pressure of a hydraulic fluid of a brake system in an automotive vehicle. The sliding contacts 23, 24 constitute, as shown in FIG. 3, bridge sliding contacts and are moveable in response to the hydraulic pressure acting on the hydraulically operable means 26. According to FIGS. 1 to 4, the printed circuit board 1 comprises two separate switches 13, 15 that can be conductively interconnected through the bridge sliding contacts. Moreover, provided on the printed circuit plate 1 are the bridge sliding contacts, the relay 19 to be driven by the switches and the connectors 10 for placing the printed conductors into communication with external circuits.

Any desired number of switching contacts can be configured as opening, closing or change-over switches. The relay or, optionally, the relays, can be of a bistable or monostable configuration or may be provided with a retaining contact. The switching contacts may be in the form of bridge sliding contacts or of any other suitable configuration. The switching contacts on the printed circuit board are gold-plated or suitably treated otherwise for permanent operation. The printed circuit board and the parts located thereon are accommodated in a housing in communication with the hydraulics. The position of the sliding contacts 23, 24 relative to the contacts 11, 12, 14, 16, 17 and 18 depends on the pressure exerted on the carrier 25. Carrier 25 is linearly moved by means of pressure, thereby associating a certain pressure to the length of the contacts 11, 12 and 14, respectively. Equally, a predetermined pressure exerted upon the carrier 25 corresponds to the beginning and end of the contacts 11, 12 and 14. Contact 14 is of a length covering the whole of the pressure range resulting in a corresponding linear displacement of carrier 25. Special reference is to be made in this respect to three pressures, viz. the zero pressure, a lower threshold value of the operating pressure and an upper threshold value of the operating pressure. The positions of the sliding contacts 23 and 24 corresponding to these three pressures, in FIG. 4, are respectively indicated by lines designated by numerals 27, 28, 29. The arrangement of contacts 11, 12 and 14, 16, 17, 18 in FIG. 4 relative to positions 27, 28, 29 results in that contact 14 extends across the full length between positions 27 and 29. Contacts 11 and 12 extend between positions 28, 29. Contacts 16, 17, 18 respectively form round, e.g. circular, spots on positions 27, 28, 29. Consequently, contacts 14, 16, at zero pressure, are conductively interconnected whereas contacts 11 and 12 are electrically isolated. From the lower threshold value of the pressure to the upper threshold value of the pressure, contacts 11, 12, through the sliding contact 23, are electrically interconnected. At the lower and upper pressure thresholds, respectively, contacts 14 and 17 or 14 and 18, through sliding contact 24 respectively are conductively interconnected.

The arrangement as shown in FIGS. 1 to 4, preferably, is used as a pressure warning and pressure control switch for the brake pressure of automotive vehicles, wherein a brake skid control means 30 is connected, through the associated plug connectors 10, to the printed conductors 2, 3. Connected between the printed conductor 5 and ground potential is a warning means 31, e.g. a light. Printed conductor 4 is energized by the positive pole of an operating voltage source 32. The printed conductor 8 is applied to ground potential whereas the printed conductor 9 is in communication with a pump relay 33 of a motor of an electrical pressure pump for generating the pressure of the hydraulic pressure fluid of the brake system.

If the pressure drops from an elevated value, the sliding contact 24 is passed across contacts 18 and 17 to contact 16 through which the circuit for the warning means 31 is closed. The sliding contact 23 will come to a standstill in a position wherein the circuit to the brake skid control means 30 is interrupted resulting in the switch-off or partial switch-off thereof. If the pressure rises from zero, the brake skid control means will be switched on at a lower threshold value corresponding to position 28, whereas the warning means is switched off. Position 28, with relay 19 switched-on, is traversed until position 29 is reached wherein coil 21 opens contact 22 such that the pump is switched off.

As the operation of the relay 19 is absolutely flutter-free and the chatter time extremely short, the control of the pump is effected with a high repetitive accuracy. If the pressure drops below the value corresponding to position 29, relay 19 is switched on causing the pump to start.

As all printed circuit boards 1 emerge from the same master film, the switching intervals of all pressure warning and pressure control switches are identical. It is only the printed circuit panel that is once adjusted relative to the hydraulic drive.

The plug connectors 10, externally, protrude through the housing and are in communication with the lines of a cable harness. The pump relay can be mounted on the printed circuit board 1. The sliding contacts 23, 24 are insensitive to contamination.

To cause the arrangement as shown in FIGS. 1 to 4 to start up from the resting position, the switch-over contact 22, through a voltage pulse on coil 20, is placed into the position as shown in FIG. 4. The said voltage pulse can be generated, for example, by operating the ignition key.

Figure 5:
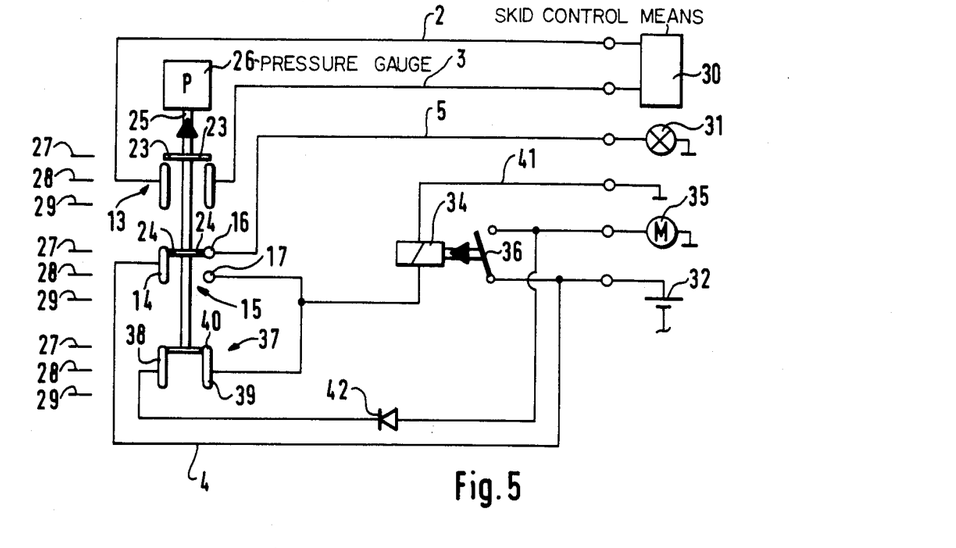
FIG. 5 is a circuit diagram of a second form of a switching mechanism according to the invention.

FIG. 5 shows a circuit diagram of a second form of embodiment of an electrical switching mechanism for circuits in automotive vehicles. In part, the switching mechanisms according to FIGS. 1 to 4 and FIG. 5 are identical. Identical elements, in FIGS. 1 to 5, are provided with like reference numerals. In the arrangement according to FIG. 5, a relay 34 for a pump motor 35 is located on the printed circuit board 1.

The said relay 34 is equipped with a working contact 36 assuming the function of the retaining contact. The relay 34 can also be in the form of a double-anchor comprising two series-arranged working contacts. The arrangement according to FIG. 5, in addition to switches 13 and 15, comprises a third switch 37 having two elongated stationary contacts 38, 39 disposed in spaced relationship and in parallel with respect to one another, and having a sliding contact 40 fixed to the carrier 25. The contacts 17 and 39, through printed conductors not described in any greater detail, are in communication with one of the connections of the coil of the relay 34, the other connection of which, through a printed conductor, is applied to ground potential. The positive pole of the operating voltage source 32, in addition, is in communication with contact 36, the other connection of which is in communication with the pump motor 35. Contact 38, through a printed conductor not described in any greater detail, is in communication with the cathode of a diode 42 which, through another printed conductor, is applied to the plug connector in communication with the pump motor 35. The two contacts 38, 39 are of a length extending between positions 27 and 28 similarly applicable to all three switches 13, 15, and 37.

In non-pressurized condition, all sliding contacts 23, 24, 40 are in the same position 27. The brake skid control means 30, through switch 13, is switched off. Switch 15 has turned on the warning means 31 and switch 37 is a permanent contact for establishing the holding functions for the relay 34. Once the pressure rises, the switch 13 turns on the brake skid control function. Switch 15 turns off the warning means 31. If the pressure continues to rise, the switch 37 switches off the holding function of the relay 34 thereby causing the relay 34 to drop out.

Once the pressure drops, switch 37 prepares for the holding function of the relay 34. Switch 15 is closed causing the relay 34 to pull up. Through diode 42 and the holding contact of the switch 36, the coil of the relay 34 remains energized, the pump starts to operate and the pressure rises. If switch 37 re-interrupts the holding function of the relay 34, the relay 34 drops out.

The accuracy of the switching points depends on the accuracy of the printed conductors (switching contacts) with respect to one another. This can be established very precisely through the film pattern.

The arrangement as shown in FIG. 5 is caused to start up, from the resting position, in that, during start-up, a voltage pulse is applied to the relay 34 which pulse causes the relay to pull up. The said voltage pulse can be generated during operation of the ignition key.

Figure 6:
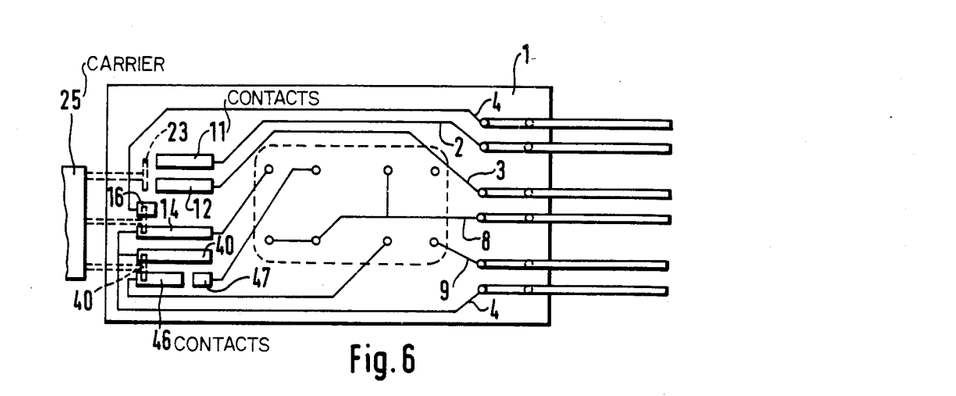
FIG. 6 is a schematic plan view of a third form of an electrical switching device according to the invention.
Figure 7:
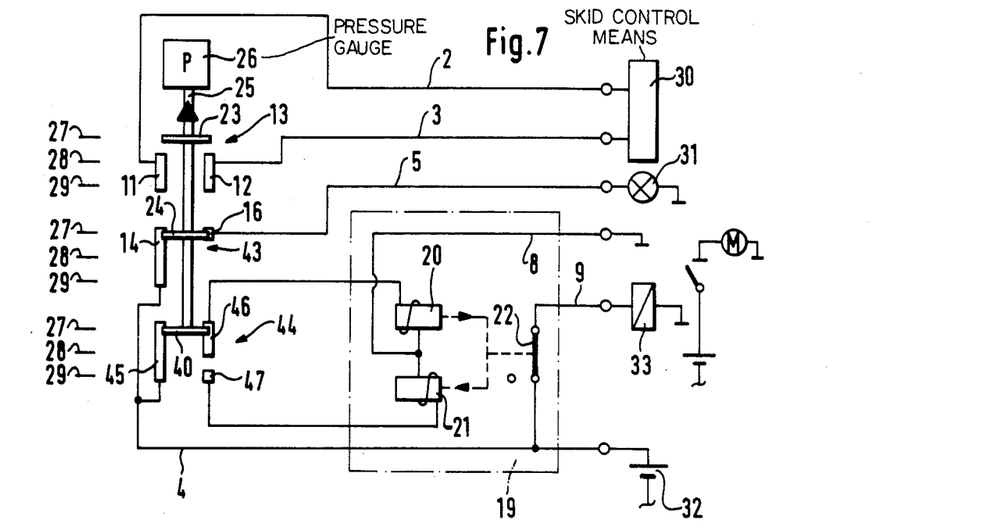
FIG. 7 is a circuit diagram of the switching device shown in FIG. 6.

In the switching mechanism as shown in FIGS. 6 and 7, as well as in the device illustrated in FIG. 5, three switches are provided of which a switch 13 is of identical configuration as in the device according to FIG. 5. Identical elements as shown in FIGS. 1 to 7 are provided with the same reference numerals. A second switch 43 includes the sliding contact 24 and, in addition, two further contacts 14, 16 merely extending across the difference between positions 27 and 28. A third switch 44 includes the sliding contact 14 and three stationary contacts 45, 46, 47. The contact 45 is elongated and extends between positions 27 and 29. The contact 46 extends between positions 27 and 28 in parallel to contact 45 and contact 47 is located at the level of position 29 longitudinally spaced from contact 46. The contacts 14 and 45 are connected in conductive communication. The contacts 46 and 47 are respectively in communication with a connection of a coil 20, 21 of relay 19 which is switched in the same manner as in the device of FIG. 4. Contacts 11 and 12 respectively extend between positions 28 and 29. Contacts 14 and 16 preferably extend respectively between positions 27 and 28.

Switch 13 serves to turn off or partially turn off the brake skid control means 30. In position 27, switch 13 is opened. In positions 28 and 29, switch 13 is closed. Switch 43 drives the warning means 31 and is closed in position 27. The switch 44, through the bistable relay 19, drives the pump for the hydraulic pressure fluid. The contact 22, in positions 27 and 28, is closed and, in position 29, is opened.

Figure 8:
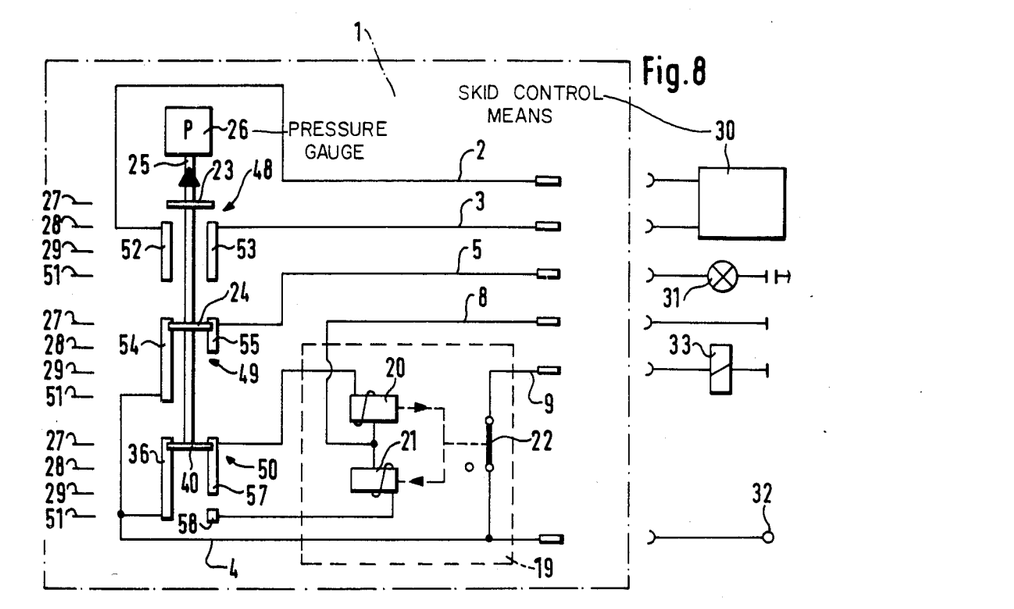
FIG. 8 is a circuit diagram of a fourth form of a switching mechanism.

The form of embodiment as shown in FIG. 8 differs from the form of switching mechanism as shown in FIG. 7 only by extended stationary contacts of the three switches designated by 48, 49 and 50. The switches 48, 49, 50 respectively comprise the sliding contacts 23, 24 and 40; however, as compared with the device according to FIG. 7 they are displaceable across a distance differently subdivided in terms of contacts. Positions 27, 28 29 are provided in addition to a fourth position 51 corresponding to the upper limit of the pressure. Preferably, positions 27, 28, 29 and 51 correspond to the following pressure values: 0; 105; 140; and 180 bar. Switch 48 comprises two parallel, stationary contacts 52, 53 of equal length that extend between positions 28 and 51. Switch 49 comprises two parallel, stationary contacts 54, 55 that extend between positions 27, 28. Switch 50 comprises three contacts 56, 57, 58. Contact 56 is connected in conductive communication with contact 54. It extends between positions 27 and 51. Contact 57 is opposite contact 56 in parallel spaced relationship and extends between positions 27 and 29. Contact 58 is at the level of position 51 longitudinally of contact 57. FIG. 8 shows the sliding contacts 23, 24, 40 in a position with the device non-pressurized.

In position 27, at a pressure of less than 105 bar, the brake skid control means, through switch 48, is turned off whereas the warning means 31, through switch 49, is turned on, remaining so until the pressure has reached 140 bar. In positions 27, 28 and 29, switch 50 turns on the coil of relay 19 thereby closing the working contact 22.

If the pressure rises, the sliding contacts 23, 24 and 40 reach position 51 wherein the working contact 22 is opened thereby switching off the pump. If the pressure drops, the sliding contact 40, through coil 20, reswitches the working contact 22 thereby turning on the pump.

Figure 9:
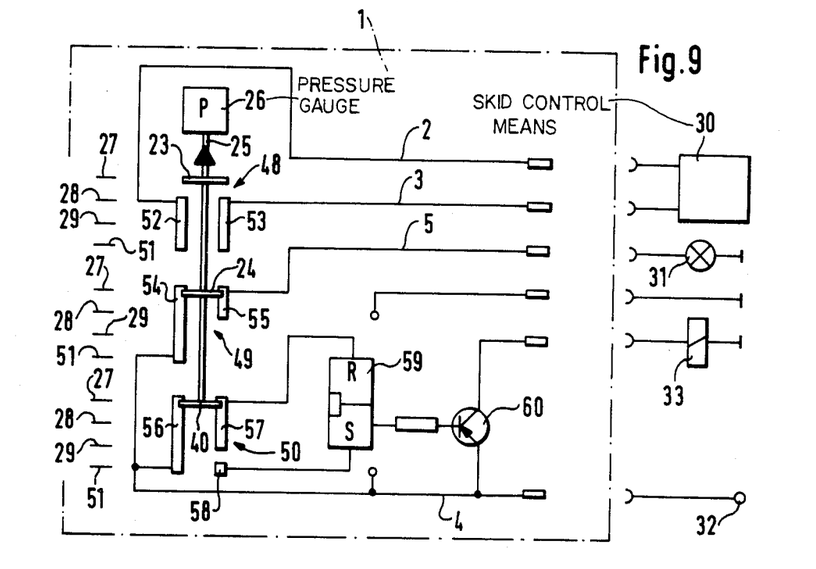
FIG. 9 is a circuit diagram of a fifth form of a switching mechanism.

In the form of embodiment as shown in FIG. 9, switches 48, 49 and 51 are identical with those of the device according to FIG. 8. There are some differences with respect to the relay 19 which is replaced by an arrangement comprising an RS-flip-flop 59 and a bipolar switch transistor 60. The resetting and setting inputs of the flip-flop 59 are in communication with contacts 57, 58, respectively. The non-inverting output of the flip-flop, through a resistor not numbered nor described in any greater detail, is in communication with the base of switch transistor 60, the emitter/collector path of which is provided between the printed conductor 4 and the plug connector 10 for connection to the relay 33. The flip-flop 59 is energized by the operating voltage source through corresponding printed conductors on the printed circuit panel 1 not described in any greater detail.

Figure 10:
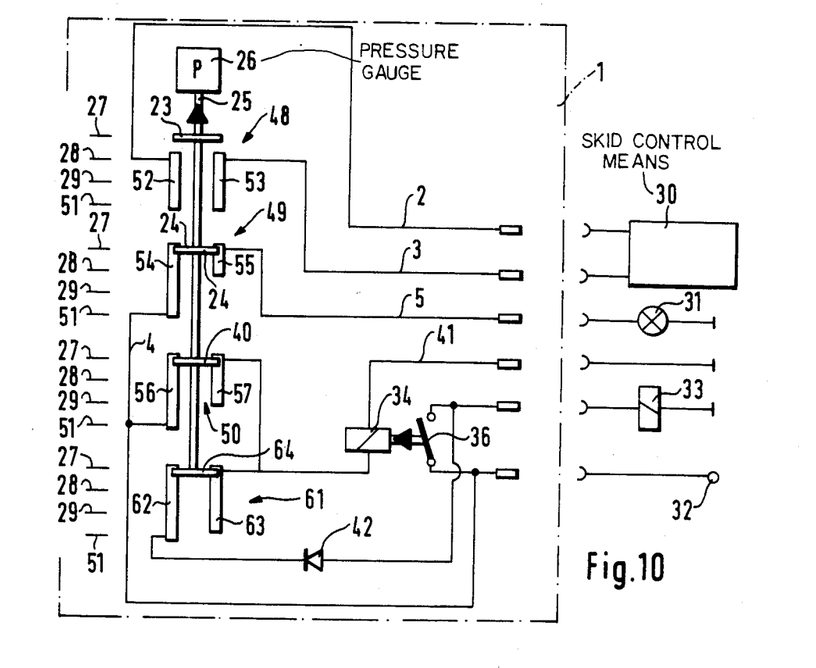
FIG. 10 is a circuit diagram of a sixth form of a switching mechanism.

FIG. 10 shows a switching mechanism comprising four switches of which three are of identical configuration as switches 48, 49 and 50 of the device as shown in FIG. 8. Identical elements, in the devices according to FIGS. 9 and 10, are designated by like reference numerals. The connections to the switches 48, 49 are identical with those of the device according to FIG. 8. The fourth switch 61 comprises two parallel, stationary contacts 62, 63 of approximately equal length, and a sliding contact 64.

The contacts 57 and 63 are commonly applied to a connection of a relay 34 comprising a working contact 36. Contact 62 is in communication with the cathode of a diode 42 the anode of which is applied to operating voltage. Working contact 36 is located between operating voltage and the pump relay 33.

Contacts 52, 53 respectively extend between positions 28 and 51; contacts 54, 55 respectively extend between positions 27 and 28.

In the arrangement as shown in FIG. 10, the working contact 36 also assumes the function of a retaining contact. Switches 48, 49 operate as in the arrangement according to FIG. 8. Between positions 27 and 28, the brake skid control means 30 is turned off or partly turned off, whereas the warning means 31 is switched on. Between positions 29 and 51, the pump is turned off. Switch 50, in positions 27, 28 and 29, turns on the relay 34. Thereafter, the switch 61, through working contact 36 and diode 42, assumes the retaining function. Switch 50 opens at a pressure higher than 140 bar. Switch 61 opens upon reaching a pressure of 180 bar. The retaining current of the relay 34 will be interrupted, the relay 34 is caused to drop out. With a decreasing pressure to below 180 bar, switch 61 closes. Upon reaching position 29 of switch 50, the relay 34 pulls up again.

Figure 11:
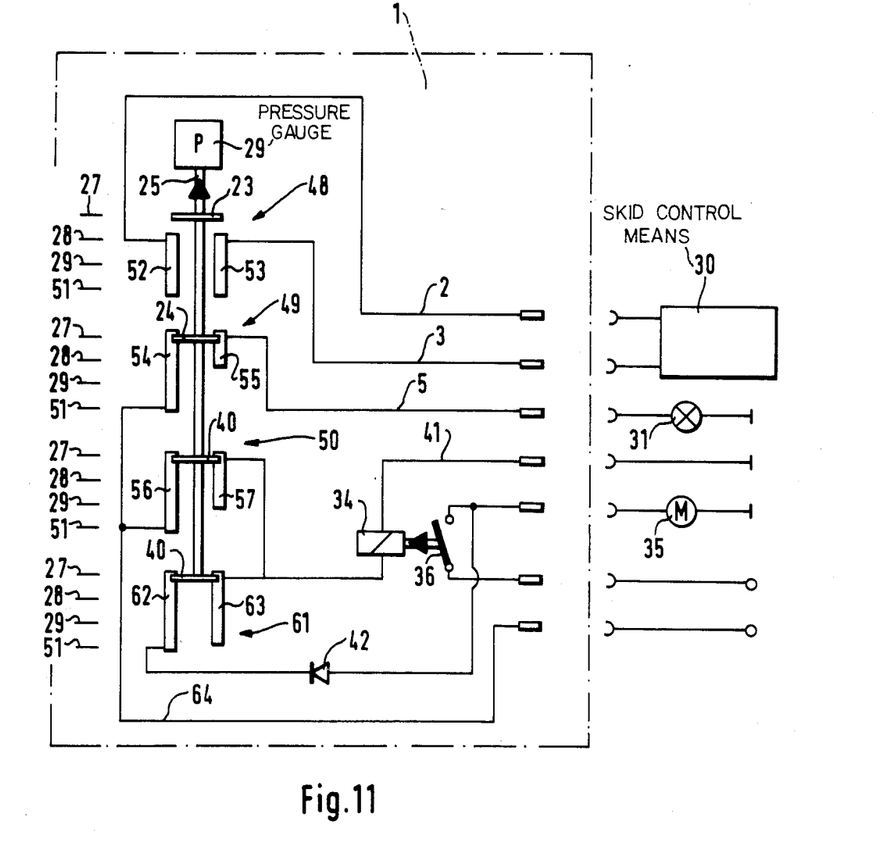
FIG. 11 is a circuit diagram of a seventh form of a switching mechanism.

FIG. 11 shows a switching mechanism the construction of which largely corresponds to the one of the device as shown in FIG. 10.

A difference between the two devices resides in that the contacts 54 and 56 of the switches 49 and 50, through a printed conductor, are commonly applied to an external plug connection which, through the ignition lock of the automotive vehicle, is supplied with operating potential. The relay 34, through the working contact 36 thereof, directly controls the pump motor 35. Voltage is directly supplied to the working contact 36 through the operating voltage source. The printed circuit board 1, therefore, requires an additional plug connector. As the working contact 36 is no longer located in the circuit of the switch of the ignition key, the current requirement is relatively low. The contact of the ignition key can, therefore, be designed for low currents.

What is claimed is:

1. An electrical switching mechanism for circuits in automotive vehicles having a hydraulic system, said mechanism comprising a printed circuit board and at least one switch disposed on the printed circuit board, a sliding contact fixed to a hydraulically movable carrier for moving said sliding contact along a path of displacement, stationary contacts located on the printed circuit board in oppositely spaced relationship with respect to each other and arranged as expanded printed conductor ends, the stationary contacts being further located along the path of displacement of said sliding contact;

wherein at least one second switch is located on the printed circuit board, said second switch including a second sliding contact fixed to said carrier for movement along a second path of displacement, contacts stationarily disposed on the printed circuit board in oppositely spaced relationship with respect to each other and provided as expanded printed conductor ends, the stationary contacts of said second switch being further located along said second path of displacement so that conductive contact is established in certain positions of the sliding control along said second path of displacement while the sliding contact of the first switch, in these positions, does not contact adjacent stationary contacts; and, wherein the stationary contacts of the second switch comprise an elongated first contact (14) and second, third and fourth circular contacts (16, 17 and 18) arranged in series and spaced relationship with each other and in parallel with said elongated first contact, the third and fourth contacts being in communication with a coil of a bistable relay comprising a working contact for controlling, through a pump relay, the operating state of a motor actuating a pressure pump for the hydraulic fluid.

2. A switching mechanism according to claim 1 wherein a third switch is located on the printed circuit board, said third switch comprising an additional sliding contact fixed to said carrier for movement along a third path of displacement, said third switch further comprising three stationary contacts located along the third path of displacement on the printed circuit board in oppositely spaced relationship and arranged as expanded printed conductor ends, in one position said third switch conductively connecting a common contact to a second contact of said third switch connected to a coil of a bistable relay and, in another position said third switch conductively connecting the common contact of said third switch to a contact in communication with the other coil of the bistable relay, a pump relay being controllable by the bistable relay for turning on and off a motor of a pressure pump for hydraulic fluid.

3. A switching mechanism according to claim 1 including a second switch located on the printed circuit board, said second switch including a sliding contact fixed to said carrier for movement along a second path of displacement and further including a second set of stationary contacts disposed along the second path of displacement and arranged as expanded printed conductor ends, the stationary contacts of said second switch including an elongated contact and second and third circular contacts in parallel spaced relation to said elongated contact, said second and third contacts being spaced from each other and a third switch located on the printed circuit board, said third switch including a sliding contact fixed to said carrier for movement along a third path of displacement and further including first and second elongated contacts disposed along the third path of displacement and arranged as expanded printed conductor ends, said second and third switches having one position wherein the elongated and second contact of said second switch and the first and second elongated contacts of said third switch are bridgeable by their associated sliding contacts for connection with the coil of a relay having a working contact for controlling the operating state of a motor actuating a hydraulic pressure pump, and a diode connected between the first elongated contact of said third switch and the working contact side of said relay.

4. A switching mechanism according to claim 1 including a third switch located on the printed circuit board, said third switch including a sliding contact fixed to said carrier for movement along a third path of displacement and further including a third set of stationary contacts disposed along the second path of displacement and arranged as expanded printed conductor ends, the stationary contacts of said second switch including an elongated contact and a shorter contact in parallel space relation to said elongated contact, and a fourth switch located on the printed circuit board, said fourth switch including a sliding contact fixed to said carrier for movement along a fourth path of displacement and further including a pair of elongated contacts disposed along the fourth path of displacement and arranged as expanded printed conductor ends, the shorter stationary contact of said third switch and one of the elongated stationary contacts of the fourth switch being commonly connected to the coil of a relay having a working contact for controlling the motor of a hydraulic pressure pump, the other stationary contact of the third switch being connectable to an operating voltage and the other contact of the fourth switch being connected through a diode to the working current output of the working contact.

5. A switching mechanism according to claim 4, characterized in that the other contact of the third switch is connected to a contact actuable by the ignition key of an automotive vehicle for connection to operating voltage.

6. A switching mechanism according to claim 1 including a third switch located on the printed circuit board, said third switch including a sliding contact fixed to said carrier for movement along a third path of displacement and further including a third set of stationary contacts disposed along the second path of displacement and arranged as expanded printed conductor ends, the stationary contacts of said second switch including an elongated contact and second and third circular contacts in parallel spaced relation to said elongated contact, said second and third contacts being spaced from each other said second contact being connected to the reset input of a flip-flop and said third contact being connected to the set input of the flip-flop, said flip-flop having its output connected to a switch transistor for controlling a pump relay through which a motor actuating a hydraulic pressure pump can be turned on and off.

* * * * *